Jan. 19, 1937.　　　O. W. OVERHULS　　　2,068,193
NOZZLE ATTACHMENT
Filed March 15, 1935
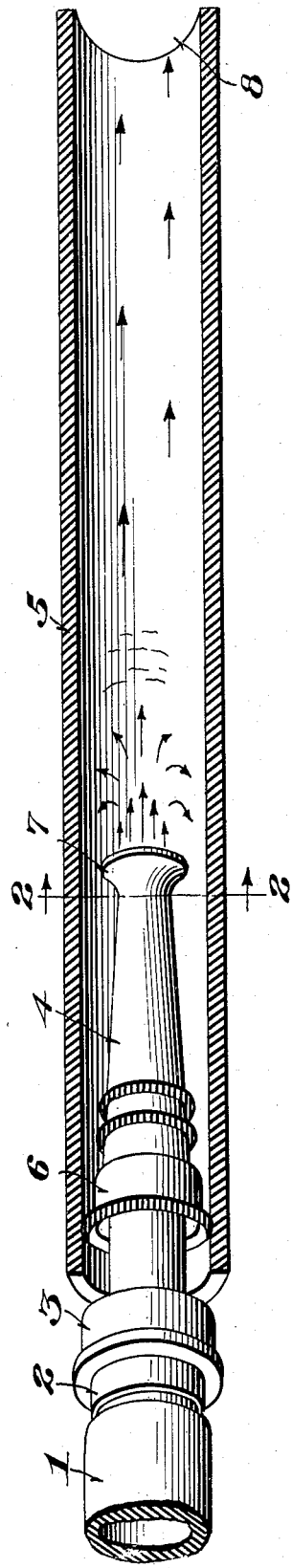
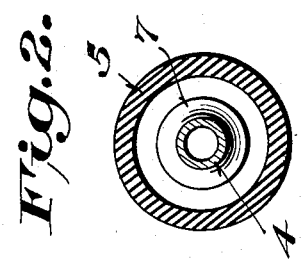
Inventor
Oscar W. Overhuls,
By Richard & Richard,
his Attorneys Patented Jan. 19, 1937

2,068,193

UNITED STATES PATENT OFFICE 2,068,193

NOZZLE ATTACHMENT

Oscar W. Overhuls, Delta, Colo.

Application March 15, 1935, Serial No. 11,271

2 Claims. (Cl. 299—107)

This invention is a nozzle attachment, for connection with any ordinary spray nozzle on a garden hose, for the purpose of changing the discharge of water from the nozzle from a fast flowing spray or stream to a gentle slow flowing stream with much less force than would flow from an open hose not provided with a nozzle, thus enabling the delivery of water gently to the roots of plants without digging up, washing away or packing down the soil around the roots or otherwise damaging the plants.

In the drawing,

Figure 1 is a perspective view of a portion of a garden hose having the attachment of the present invention applied to the nozzle thereof;

Figure 2 is a side elevation of Figure 1, the attachment being in section.

The reference numeral 1 designates an ordinary rubber garden hose having the usual threaded coupling 2 thereon, to which is fitted any common or preferred form of nozzle, the one illustrated in the accompanying drawing including the stationary part 3 screwed upon the coupling 2, and an adjustable sleeve member 4, adjustably screw threaded upon the stationary part 3. As these parts are common and well known and form no part of the present attachment, it is not deemed necessary to illustrate the same in detail.

The attachment of the present invention is a length of rubber hose or tubing 5 open at opposite ends and interiorly open and unobstructed from end to end. The internal diameter of the tube 5 is such as to snugly receive the shoulder member 6, as shown in the drawing, the tube being forced endwise upon the shoulder until tube 5 is sealed tight on shoulder 6 by friction. By reference to Figure 2 it will be seen that the shoulder 6 of the nozzle fits snugly the inner walls of the tube, whereby the tube is removably held in place on the nozzle. A tubing length of twelve inches has given satisfactory results.

Preparatory to fitting the tube 5 in place, the sleeve 4 is turned and thus adjusted to close the nozzle against the flow of water, and then the tube may be conveniently fitted in place upon the nozzle. Thereafter the tube and the sleeve 4 may be turned together so as to open the nozzle and permit the flow of water when it will be found that the flow of water from the open forward end of the tube will be a fussy noisy broken stream, which will continue until the partial vacuum in the region back of the annular flange 7 and around sleeve 4 is overcome by applying a backwater force at the outer aperture 8, the end of tube 5. This backwater force may be supplied by pressing said aperture 8 to the ground, grass, hand or any convenient obstacle, and since up to the time of application of this force, a vacuum (less than atmospheric pressure) exists in the region back of the annular flange 7, the application of such force "piles" the broken stream up inside the tube 5 forming a "water seal" in the tube 5 and in the region back of the annular flange 7 and around the nozzle sleeve 4. The obstacle impeding or creating a backwater force may then be removed and the water seal thereby created will be held intact by the outside atmospheric pressure which exceeds the pressure inside the tube with the result that a gentle slow moving stream of water will issue from the front open end of the tube to be safely and satisfactorily delivered to the roots and stems of plants without damage thereto and without the undesirable results occasioned by the fast moving stream of water such as commonly discharges from either a nozzle on a garden hose, or an open hose.

Varying degrees of velocity and quantity of water flowing from the tube may be obtained by adjusting the nozzle, but always the velocity will be greatly reduced below that which ordinarily maintains within the nozzle not equipped with the attachment of the present invention.

After a gentle stream is so obtained it can be changed back to the so-called "fussy noisy broken-up stream" by cutting off the supply of water by turning the nozzle, kinking the hose, or in any other manner which causes the water seal in the tube 5 to be broken so that the water again flows as it did originally from the tube. These conditions can thus be alternated at will from the noisy broken-up stream to a gentle slow moving stream, and vice-versa by following the procedure above described.

Such a combination is simple, practical, efficient and inexpensive, yet it involves the application of some of the most important fundamental basic principles of physics.

In addition to the advantage gained in reducing the velocity of the water to a gentle, slow moving stream, such an attachment will meet the requirements of the strictest municipal ordinances forbidding irrigation by open hose.

What I claim is:

1. The combination with a garden hose and a nozzle thereon, said nozzle having a discharge sleeve provided with a flared exit end and a tapered shoulder in rear of the flared exit end, of an open ended flexible tube snugly embracing the tapered portion of the shoulder and projecting beyond the discharge end of the nozzle for such a distance as will produce the results described.

2. The combination with a garden hose and a nozzle thereon having an external shoulder in rear of the discharge end of the nozzle, of an open ended flexible tube snugly engaging the shoulder and projecting beyond the discharge end of the nozzle for such a distance as will produce the results described, the interior diameter of the tube being greater than the exterior diameter of the discharge end of the nozzle.

OSCAR W. OVERHULS.